(12) United States Patent
Guo et al.

(10) Patent No.: US 10,699,193 B2
(45) Date of Patent: Jun. 30, 2020

(54) METHODS, DEVICES, AND SYSTEMS FOR REDUCING DEVICE TEST TIME

(71) Applicant: Seagate Technology LLC, Cupertino, CA (US)

(72) Inventors: ChengYi Guo, Singapore (SG); Teck Khoon Lim, Singapore (SG); Teck Hoon Chua, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 205 days.

(21) Appl. No.: 15/833,135

(22) Filed: Dec. 6, 2017

(65) Prior Publication Data

US 2019/0171940 A1 Jun. 6, 2019

(51) Int. Cl.
| | |
|---|---|
| *G06F 11/00* | (2006.01) |
| *G06N 3/08* | (2006.01) |
| *G11B 27/36* | (2006.01) |
| *G11B 5/455* | (2006.01) |
| *G11B 5/31* | (2006.01) |
| *G11B 5/09* | (2006.01) |

(52) U.S. Cl.
CPC .......... *G06N 3/086* (2013.01); *G06F 11/008* (2013.01); *G11B 5/455* (2013.01); *G11B 27/36* (2013.01); *G11B 5/09* (2013.01); *G11B 5/3116* (2013.01); *G11B 5/3163* (2013.01); *G11B 2220/2516* (2013.01)

(58) Field of Classification Search
CPC .......... G06N 3/086; G06N 3/02; G06N 7/005; G06N 7/046; G06N 5/046; G06N 5/048; G06F 11/008; G06F 11/1476; G06F 11/22; G06F 11/2263; G06F 2207/4824; G11B 27/36; G11B 5/3116; G11B 5/3163; G11B 5/3166; G11B 5/3173; G11B 2220/2516
See application file for complete search history.

(56) References Cited

U.S. PATENT DOCUMENTS

| | | | |
|---|---|---|---|
| 6,408,406 B1 * | 6/2002 | Parris | G11B 20/182 714/41 |
| 6,574,754 B1 | 6/2003 | Smith | |
| 7,269,525 B1 * | 9/2007 | Gough | G11B 27/36 702/123 |
| 8,316,263 B1 | 11/2012 | Gough et al. | |
| 8,521,670 B2 | 8/2013 | Pagulo | |

(Continued)

OTHER PUBLICATIONS

Zhang, Guoqiang, B. Eddy Patuwo, and Michael Y. Hu. "Forecasting with artificial neural networks:: The state of the art." International journal of forecasting 14, No. 1 (1998): pp. 35-62. (Year: 1998).*

*Primary Examiner* — Anthony J Amoroso
(74) *Attorney, Agent, or Firm* — Faegre Drinker Biddle & Reath LLP

(57) ABSTRACT

A method for testing and grading electronic devices includes receiving a set of testing data associated with an electronic device that is following a testing routine. Based on the set of testing data, the method includes computing a first performance metric of the electronic device by using a first artificial neural network and computing a second performance metric of the electronic device by using a second artificial neural network. Based on at least the first predicted performance metric and the second predicted performance metric, the method includes computing a grade for the electronic device.

20 Claims, 7 Drawing Sheets

(56) References Cited

U.S. PATENT DOCUMENTS

| | | | |
|---|---|---|---|
| 9,858,964 B1 * | 1/2018 | Wei ........................ | G11B 5/012 |
| 2006/0061356 A1 * | 3/2006 | Makifuchi ............. | G11B 5/455 |
| | | | 324/212 |
| 2017/0337482 A1 * | 11/2017 | Sindia .................. | G06Q 10/063 |

* cited by examiner

METHODS, DEVICES, AND SYSTEMS FOR REDUCING DEVICE TEST TIME

SUMMARY

In certain embodiments, a method for testing and grading electronic devices includes training a first artificial neural network to predict a first performance metric using data from predetermined categories of testing data; training a second artificial neural network to predict a second performance metric using data from the predetermined categories of testing data; and subjecting an electronic device to a plurality of tests to generate a set of data associated with the electronic device. The set of data includes categories of data from the predetermined categories of testing data. The method further includes, in response to the generated set of data, using the first neural network to compute a first performance metric associated with the electronic device, and, in response to the generated set of data, using the second neural network to compute a second performance metric associated with the electronic device. Based on at least the first predicted performance metric and the second predicted performance metric, the method includes determining that a grade for the electronic device is below a predetermined threshold for the first performance metric or the second performance metric. And, in response to the determining that the grade is below the predetermined threshold, the method includes generating an updated testing routine for the electronic device.

In certain embodiments, a method for testing and grading electronic devices includes receiving a set of testing data associated with an electronic device that is following a testing routine. The set of testing data is generated during a plurality of tests on the electronic device. Based on the set of testing data, the method includes computing a first performance metric of the electronic device by using a first artificial neural network and computing a second performance metric of the electronic device by using a second artificial neural network. Based on at least the first predicted performance metric and the second predicted performance metric, the method includes computing a grade for the electronic device. The method further includes determining whether the computed grade is below or above a predetermined threshold, and, if the computed grade is below the predetermined threshold, generating an updated testing routine for the electronic device, and, if the computed grade is above the predetermined threshold, continuing to follow the testing routine.

In certain embodiments, a system for grading an electronic device includes a computing device with a first trained artificial neural network, a second trained artificial neural network, a processor, and a memory. The computing device is configured to: receive a set of testing data associated with an electronic device and generated during a plurality of tests on the electronic device, compute a first performance metric of the electronic device using the first trained artificial neural network and the received set of testing data, compute a second performance metric of the electronic device using the second trained artificial neural network and the received set of testing data, and compute a grade for the electronic device based on at least the first performance metric and the second performance metric.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
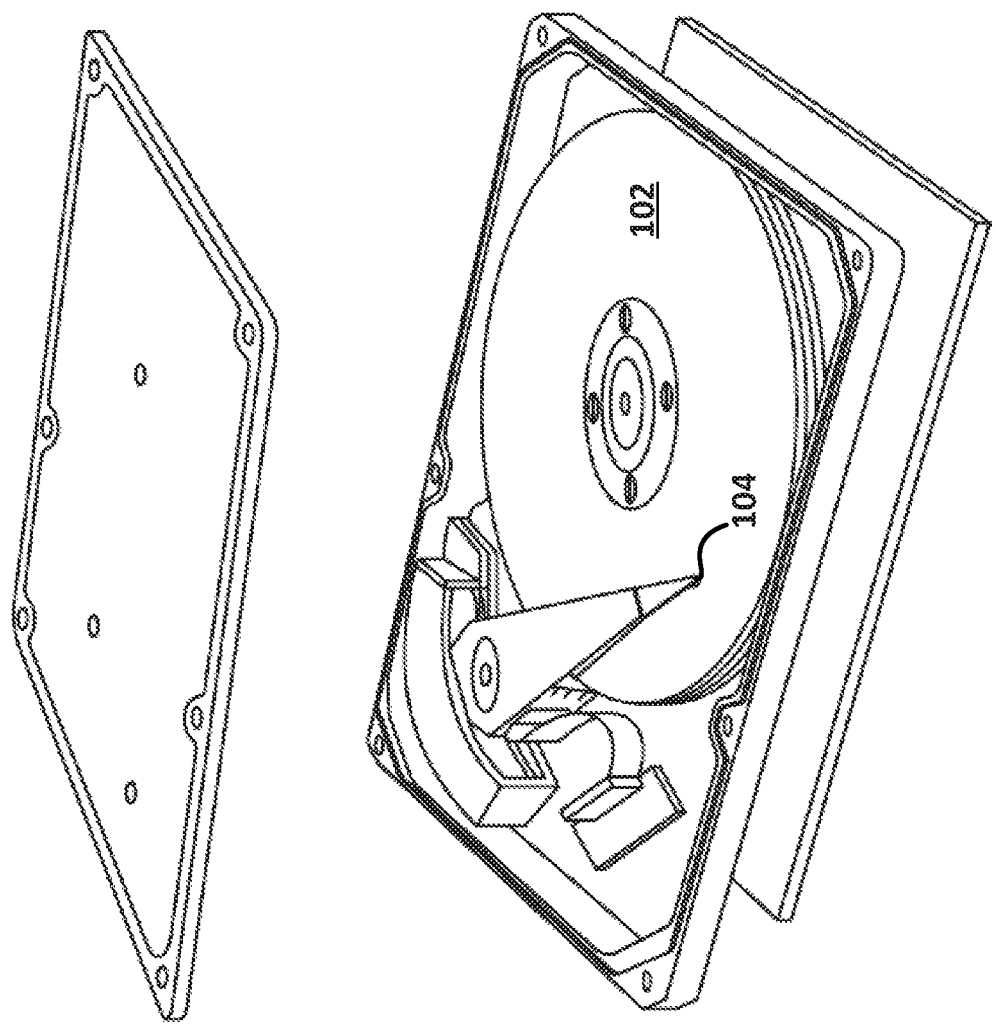
FIG. 1 shows an exploded, perspective view of a hard drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

To meet the increasing demand for digital storage, hard disc drives (such as hard disc drive 100 in FIG. 1) continue to increase in areal density. Increased areal density typically involves—among other things—increasing the number of tracks on a hard disc drive's magnetic recording media 102. Increasing the number of tracks can require reducing the size of the tracks to allow for more tracks in a given area, and decreased track sizes lead to smaller tolerances for error. Alternative approaches for increasing the number of tracks include incorporating new, more complex recording technologies such as shingled magnetic recording (SMR) and heat-assisted magnetic recording (HAMR). Yet new recording technologies require subjecting hard disc drives to additional tests during manufacture. As a result, time and cost for manufacturing hard disc drives continues to increase as the time required to test hard disc drives increases.

During manufacture, hard disc drives go through a series of tests and calibration processes (hereinafter collectively, "the series of tests") that determine the ability of an individual hard disc drive to exceed certain minimum performance requirements and, correspondingly, what applications and in what environments that hard disc drive can succeed. For example, hard disc drives in 2.5-inch form factors can be incorporated into a variety of electronic devices, such as digital video recorders (DVRs), laptops, and network-attached-storage (NAS) devices. Although a hard disc drive may have been initially intended for a DVR application, for example, the hard disc drive's performance in the series of tests may indicate that the hard disc drive should be upgraded or downgraded to a different application with different performance requirements. Further, because customers (e.g., original equipment manufacturers (OEMs)) have different minimum performance requirements, a hard disc drive initially intended for one application or environment with a particular set of minimum performance requirements may—after the series of tests—be graded for a different application or environment.

Figure 2:
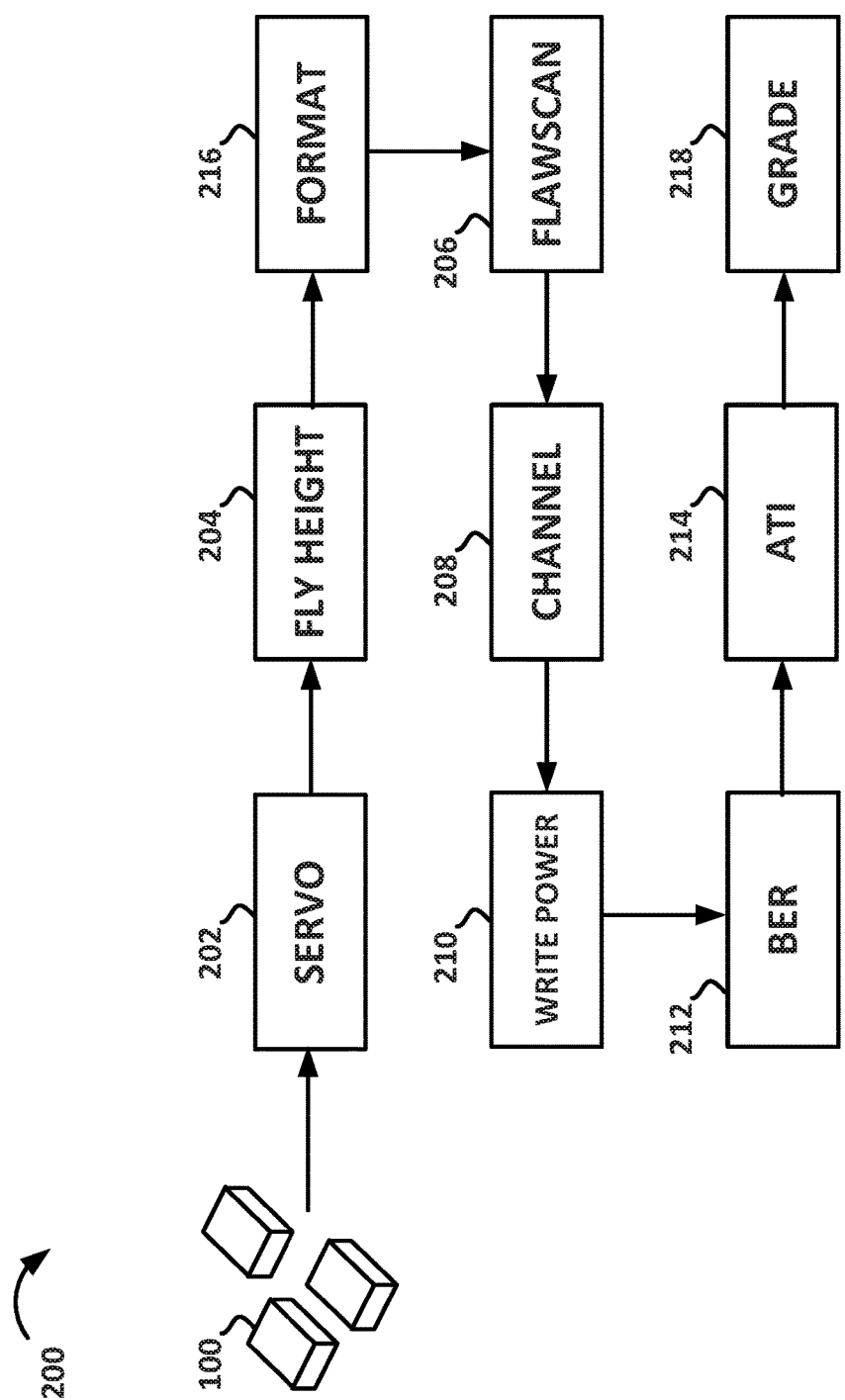
FIG. 2 shows a process with a series of steps for testing and grading a device, in accordance with certain embodiments of the present disclosure.

FIG. 2 shows a process 200 for testing and grading a hard disc drive, which includes subjecting hard disc drives 100 to the series of tests to determine their performance and/or establish operating parameters. In certain embodiments, the series of tests involve writing servo data to the magnetic recording media (e.g., 102 in the exemplary hard disc drive in FIG. 1) and calibrating servo parameters (step 202), tuning the fly height of a read/write head 104 (step 204), scanning for flaws of the magnetic recording media 102 (step 206), establishing read/write channel parameters (step 208), and tuning write power parameters (step 210), among others. While certain steps are shown in a particular order in FIG. 2, these steps (as well as the tests in the series of tests) could be performed in different orders and/or combinations.

In addition, the process 200 includes a bit-error rate (BER) test (step 212) and an adjacent track interference (ATI) test (step 214), which are discussed in more detail below. In some embodiments, the process 200 also includes formatting the hard disc drive 100 (step 216), for example, by formatting the hard disc drive 100 to utilize SMR, which involves overlapping tracks (e.g., "shingled" tracks) to increase the areal density of the hard disc drive 100. As shown in FIG. 2, the formatting step 216 may occur between various tests and calibration processes.

During each test in the series of tests, data is collected about the hard disc drive's performance. Some of this data may be referred to as key process input variables (KPIVs). For example, when calibrating servo parameters as part of step 202, data about the data tracks, such as their eccentricity with respect to the magnetic recording media 102, constitute KPIVs. In another example, when scanning for flaws as part of step 206, data about the number of flaws and/or the location of particular areas of the magnetic recording media 102 that may be unusable constitute KPIVs. In another example, when establishing fly heights in step 204, data about how the read/write head 104 responds to differences in power and/or temperature constitute KPIVs. As a result of some tests, hard disc drives 100 may "fail" (i.e., exhibit performance characteristics that do not meet minimum performance requirements), such that the hard disc drives 100 have to be reworked or ultimately scrapped.

After the hard disc drive 100 has gone through all or a majority of the series of tests (e.g., tests, formatting, calibrations), the hard disc drive 100 is graded for a particular application (e.g., DVR, laptop, NAS) and/or environment (step 218). Grading typically involves using a linear equation and a limited number of categories of the data collected during the series of tests. Such a grading process has several complications.

In one example, under the process 200, the hard disc drive 100 is formatted before being graded for a particular application or environment. Formatting limits the types of applications or environments in which the hard disc drive 100 is qualified to be used. If the formatted hard disc drive 100 does not meet the minimum performance requirements for any of the potential applications/environments of the designated format, the hard disc drive 100 may be scrapped, reworked, and/or reformatted—all of which add cost and time to the manufacturing process. Furthermore, after being reformatted, the hard disc drive 100 may need to repeat all or a majority of the series of tests before determining the hard disc drive's grade.

As another example, the process 200 lacks flexibility. When one or more tests or portions of tests are removed from the process 200, the process for grading the hard disc drives needs to be redesigned to accommodate for the fact that certain data (e.g., KPIVs) are no longer being collected. Flexibility to remove certain tests from the process 200 is desirable to reduce the overall manufacturing time of hard disc drives 100.

As a third example, the hard disc drive 100 is subjected to the bit-error rate test 212 and the adjacent track interference test 214 towards the end of the process 200. Both of these tests take hours to carry out. For example, in the bit-error rate test 212, the read/write head (104 in FIG. 1) carries out thousands of write operations to determine the error rate of the hard disc drive 100. This test can take over two hours to carry out for each magnetic recording medium 102. Likewise, the adjacent track interference test 214, involves thousands of writing operations to determine adjacent track interference. Generally speaking, adjacent track interference is caused during multiple successive write operations where magnetic fringe fields from the read/write head 104 encroach (e.g., overwrite) data written to immediately adjacent tracks. This encroachment can degrade the magnetization patterns written to the adjacent tracks, such that the hard disc drive 100 cannot reliably recover data from those adjacent tracks. If the hard disc drive 100 does not meet the minimum performance requirements for either the bit-error rate test 212 or the adjacent track interference test 214, the hard disc drive 100 must be reworked and may ultimately be scrapped. Determining whether hard disc drives 100 will fail one or more tests earlier in the process would reduce the overall manufacturing time of hard disc drives 100.

Certain embodiments of the present disclosure are accordingly directed to methods, systems, and devices for predicting and/or determining a hard drive's grade earlier in the manufacturing process. More particularly, certain embodiments of the present disclosure involve utilizing various artificial neural network approaches to predict and/or determine a hard disc drive's grade. This prediction or determination can provide reduced test time and/or increased flexibility. For example, in certain circumstances, the disclosed approaches save test time and increase a factory's throughput by reducing the number of hard disc drives that are subjected to or re-subjected to certain tests. In certain circumstances, the hard disc drive 100 can be graded before being formatted, which saves test time. Although the present disclosure uses hard disc drives as an example, the disclosed approaches may be useful for reducing test times of other types of devices (e.g., electronic devices) and components of the various types of devices.

Generally speaking, artificial neural networks are computational models based on structures and functions of biological neural networks. Artificial neural networks can be implemented under a variety of approaches, including a multilayer feedforward network approach (as described below) or a recurrent neural network approach, among others. One artificial neural network approach involves identifying various inputs and target outputs for training an artificial neural network. For example, a set of "training data"—with known inputs and known outputs—is used to train the artificial neural network. The training data can be data samples for multiple types or categories of data and corresponding known target results for each data sample.

The known inputs and outputs are fed into the artificial neural network, which processes that data to train itself to resolve/compute results for additional sets of data, this time with new inputs and unknown results. As a result, the artificial neural network can predict target outputs from a set of inputs. In this manner, a trained artificial neural network can use inputs that, individually, may not be direct parameters for particular tests or testing schemes and that may include different classes of parameters/data, to produce desired target outputs for those tests or testing schemes.

Figure 3:
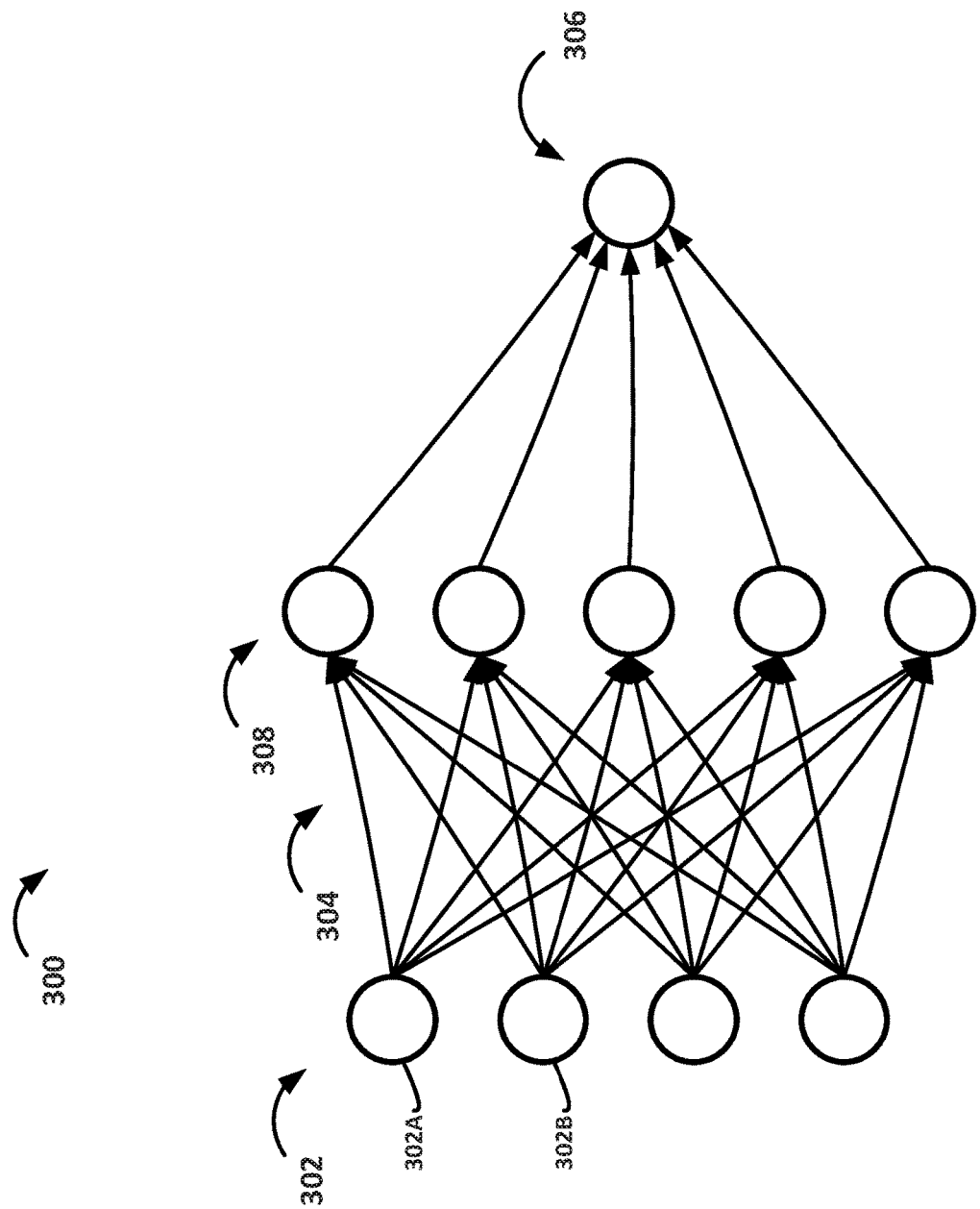
FIG. 3 represents features of a neural network, in accordance with certain embodiments of the present disclosure.

A visualization of an artificial neural network 300 is shown in FIG. 3. The artificial neural network 300 includes a number of nodes (sometimes referred to as neurons) 302 and connections 304, each of which run between a source node (e.g., 302A, 302B) and a target node (e.g., 306) in a single direction. Each node 302 represents a mathematical function (e.g., summation, division) applied to the one or more input of that node 302. Thus, each node represents types or classes of data.

An adaptive weight is associated with each connection 304 between the nodes 302. The adaptive weight, in some embodiments, is a coefficient applied to a value of the source node (e.g., 302A) to produce an input to the target node 306. The value of the target node is, therefore, a function of the source node inputs 302A, 302B, etc., multiplied by their respective weighting factors. For example, a target node 306 may be some function involving a first node 302A multiplied by a first weighting factor, a second node 302B multiplied by a second weighting factor, and so on. FIG. 3 also shows a number of hidden nodes 308, which will be explained in more detail below.

Figure 4:
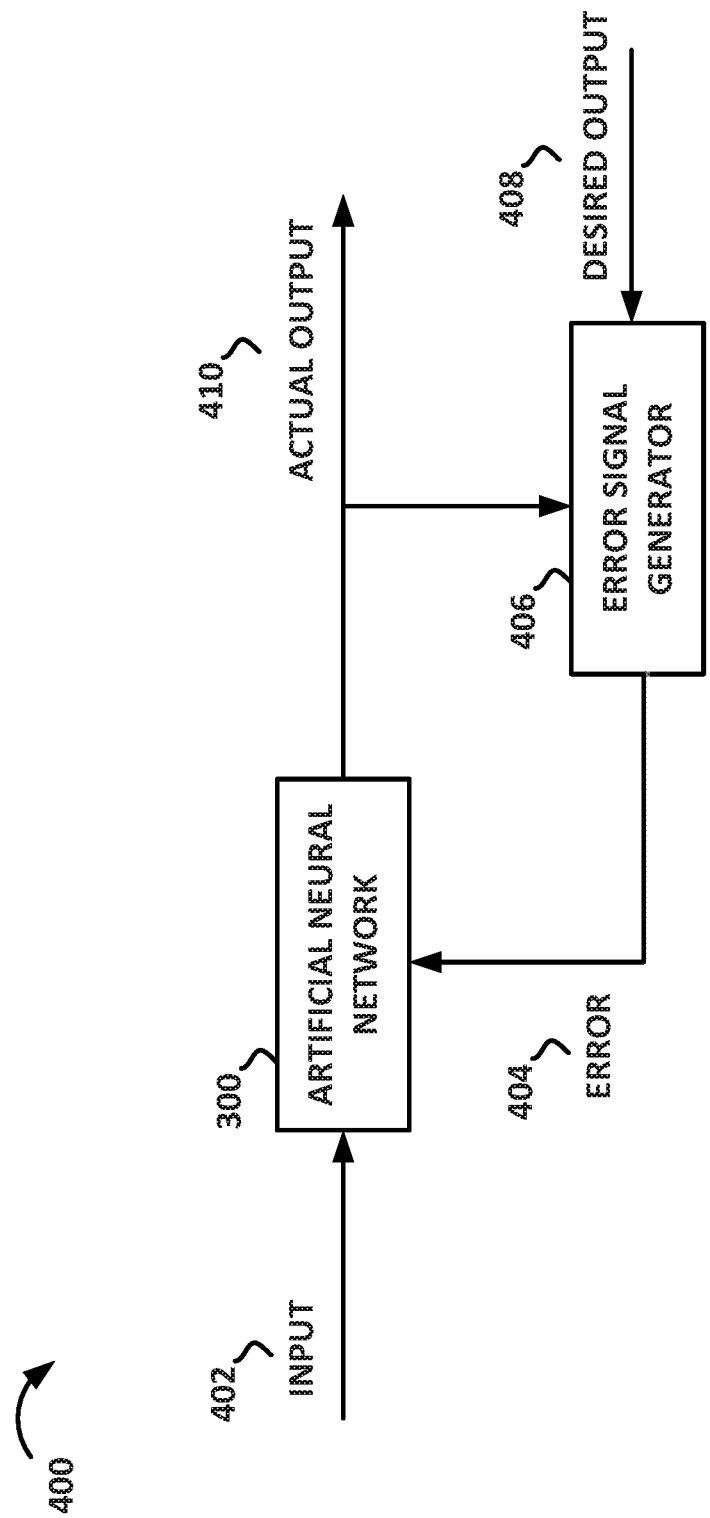
FIG. 4 shows a diagram of features of a neural network, in accordance with certain embodiments of the present disclosure.

FIG. 4 shows a diagram 400 of one approach to compute weighting factors associated with each connection 304 of the artificial neural network 300. The weighting factors are initially set to random values. Input nodes 302A, 302B, etc.—which represent types or classes of input data as discussed above—and a target node 306 are chosen to create node pairs. Next, activations (e.g., input 402) are propagated from the input nodes 302A, 302B to hidden nodes 308 for each input node 302, and then activations are propagated from the hidden nodes 308 to target nodes 306 for each hidden node 308. An error value 404 is then computed for target nodes 306 by an error signal generator 406 by comparing the desired output 408 to the actual output 410.

Next, error 404 is computed for hidden nodes 308. Based on the computed errors, weighting factors from the connections 304 are adjusted between the hidden nodes 308 and target nodes 306. Weighting factors are then adjusted between the input nodes 302 and the hidden nodes 308. To continue to update the weighting factors (and therefore train the artificial neural network 300), the process restarts where activations are propagated from the input nodes 302 to hidden layer nodes 306 for each input node 302. The artificial neural network 300 is "trained" once little to no error is computed, with weighting factors relatively settled. Essentially, the trained artificial neural network 300 learns what nodes (and therefore, inputs) should be given more weight when computing the target output.

In certain embodiments, the target output is a determination of one or more predicted performance metrics, such as a bit-error rate and/or an adjacent track interference value. As described in more detail below, multiple artificial neural networks can be used to compute different predicted performance metrics using the same set of data as inputs to the multiple artificial neural networks. In certain embodiments, the multiple artificial neural networks use overlapping, but not identical, sets of data to compute different predicted performance metrics.

Figure 5:
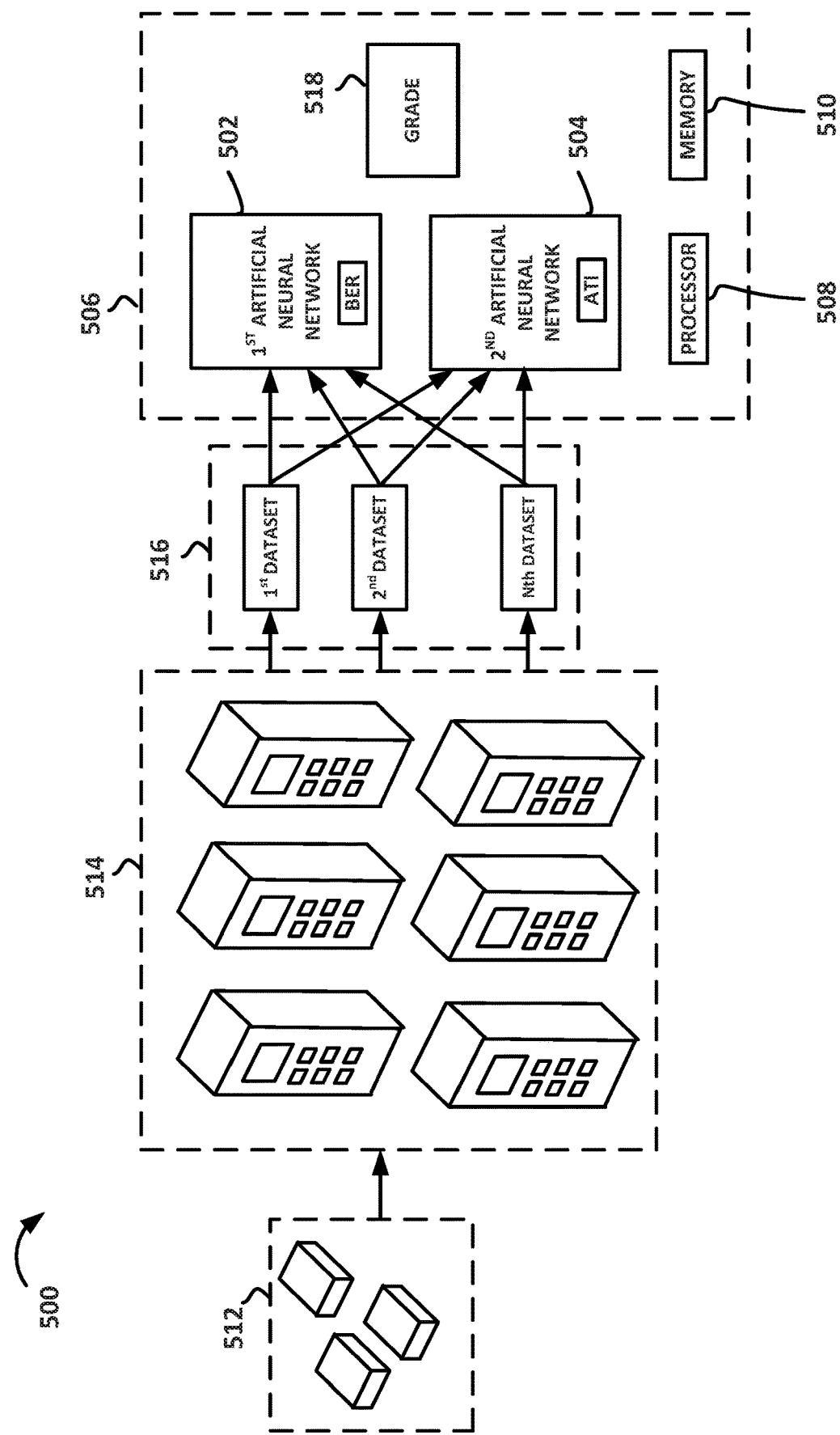
FIG. 5 shows a diagram of a system utilizing neural networks, in accordance with certain embodiments of the present disclosure.
Figure 6:
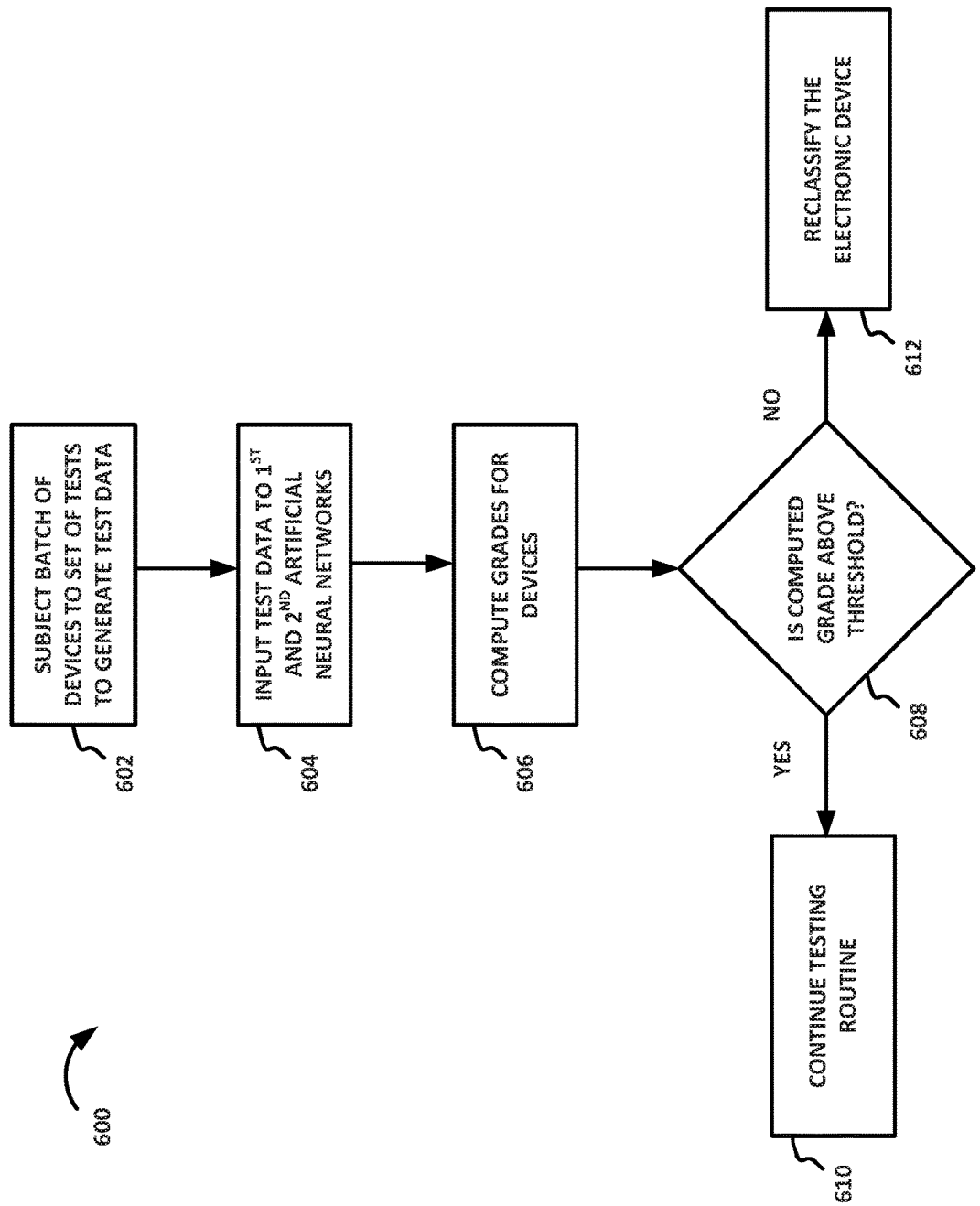
FIG. 6 shows a block representation of steps in a method for testing devices, in accordance with certain embodiments of the present disclosure.

FIG. 5 shows a system 500 that features a first artificial neural network 502 and a second artificial neural network 504, and FIG. 6 outlines a set of steps of a method 600 that can be carried out with the system 500. The first artificial neural network 502 and the second artificial neural network 504 can include similar features to the artificial neural network 300 described above and can be trained as described generally above and more specifically below. The first artificial neural network 502 and the second artificial neural network 504 and its various features and components can be implemented in one or more computing devices 506 (e.g., personal computer, laptop, server) that contain one or more processors 508 and memory 510. For example, the first artificial neural network 502 and the second artificial neural network 504 may be implemented using firmware, integrated circuits, and/or software modules within the one or more computing devices 506 that interact with each other or are combined together. In certain embodiments, the methods disclosed herein and outlined in the figures can be implemented using computer-readable instructions/code that are stored in the memory 510 (or other forms of storage) for execution by the one or more processors 508.

FIG. 5 shows a batch of hard disc drives 512 that are subjected to a series of tests 514 (step 602 in FIG. 6). As mentioned above, the series of tests 514 generate data (e.g., datasets 516) about a hard disc drive's performance, including key process input variables (KPIVs) and other types of data. In FIG. 5, the various types of data are represented by a first dataset through the $N^{th}$ dataset. Both the first artificial neural network 502 and the second artificial neural network 504 receive these datasets (step 604). In certain embodiments, the datasets include data from a set of predetermined categories and include servo parameter values, fly height parameter values, and magnetic recording medium flaw parameter values. In certain embodiments, the set of predetermined categories can be characterized as component-level (e.g., the magnetic recording media 102 and the read/write heads 104) testing data.

As mentioned above, in certain embodiments, the first artificial neural network 502 is trained to compute a first predicted performance metric of hard disc drives based on the inputted datasets 516, and the second artificial neural network 504 is trained to compute a second predicted performance metric of hard disc drives based on the inputted datasets 516. For example, the first predicted performance metric may be a hard disc drive's bit-error rate (BER), and the second predicted performance metric may be the hard disc drive's adjacent track interference (ATI) value. In certain embodiments, BER and ATI values can be characterized as device-level (as opposed to component-level) testing data. Both the BER and ATI value are computed using the same inputted datasets 516 but different artificial neural networks (i.e., the first artificial neural network 502 and the second artificial neural network 504). In certain embodiments, the multiple artificial neural networks use overlapping, but not identical, sets of data to compute different predicted performance metrics. Although only two artificial neural networks and two predicted performance metrics are described above, the system 500 and its computing devices 506 can include more than two artificial neural networks and predicted performance metrics.

Once the first predicted performance metric and the second predicted performance metric are computed, each hard disc drive in the batch of hard disc drives 512 (step 606)

receives a grade (518 in FIG. 5) based on the first predicted performance metric and the second predicted performance metric. In certain embodiments, the one or more computing devices 506 computes the grade 518 by comparing the first predicted performance metric and the second predicted performance metric and using the lower of the two to grade the hard disc drive(s) 512. The grade 518 is used to determine the application and/or environment for each hard disc drive in the batch of hard disc drives 512. For example, as mentioned above, different applications and/or environments have different minimum performance requirements (e.g., a predetermined threshold). In certain embodiments, the grade 518 can be computed to fall into an overall predetermined range (e.g., 0 to 100; 0 to 1000). The overall predetermined range may have a set of predetermined ranges that indicate whether the hard disc drive(s) 512 should be scrapped, reworked, formatted for a particular application, or determined to be sold for a particular application. For example, for an overall predetermine grade range of zero to 100, the hard disc drive(s) 512 that receive a grade below 30 may be scrapped, between 30 to 65 may be reworked, between 65 to 75 may be designated for a lower performing application (e.g., customers or applications with the lowest minimum performance requirements), between 75 and 90 may be designed for a mid-performance application, and 90 or higher may be designated for the top performance applications. In the above-described example, if the one or more computing devices 506 computes a high BER (e.g., 85) for the hard disc drive(s) 512 and a low ATI (e.g., 45), the graded hard disc drive(s) 512 will be reworked. This is because, as described above, the lower of the two predicted performance metrics is used to determine the grade 518 in certain embodiments. In other embodiments, the grade 518 can be based on an average of the two (or more) predicted performance metrics. In certain embodiments, one or more of the predicted performance metrics is given a higher weight than others.

In certain embodiments, when the determined grade 518 does not meet a predetermined threshold (step 608), the hard disc drive associated with the grade must be reclassified from its original classification (step 612). This may involve generating an updated testing routine for the hard disc drive. When the determined grade 518 meets a predetermined threshold, the hard disc drive associated with the grade can continue its testing routine (step 610).

Figure 7:
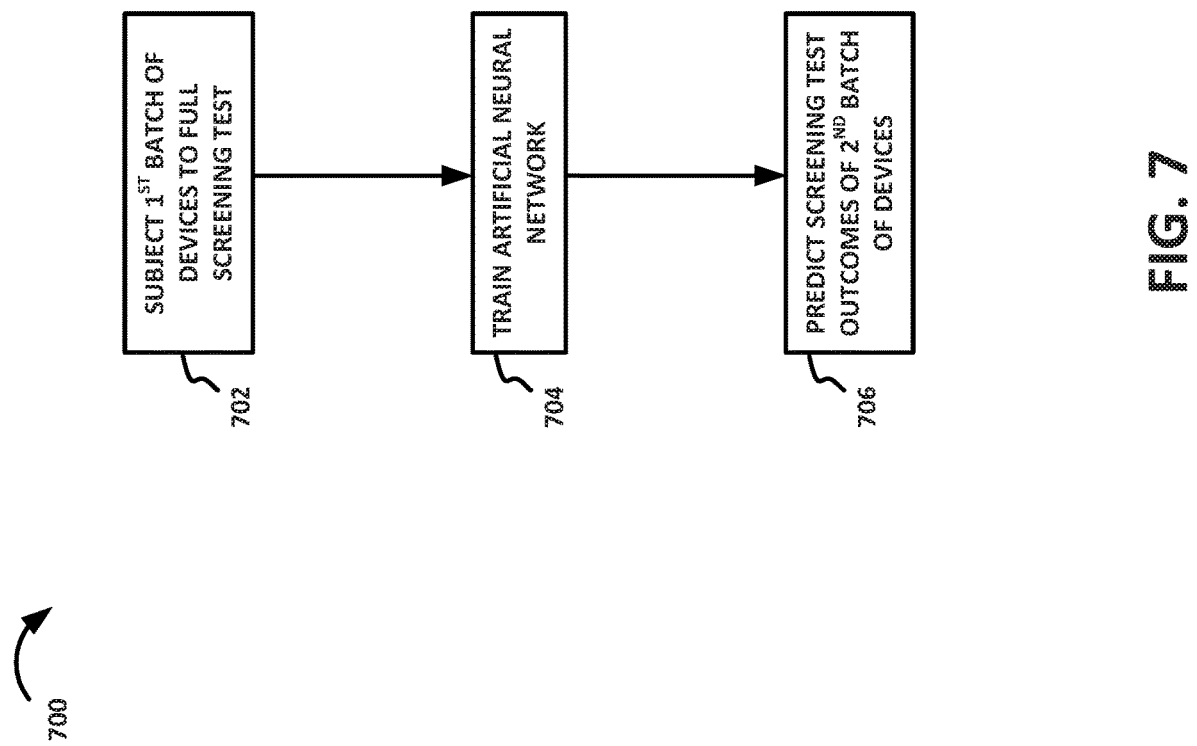
FIG. 7 shows a block representation of steps in a method for predicting test outcomes, in accordance with certain embodiments of the present disclosure.

The above-described data from the series of tests can be used as inputs to trained artificial neural networks (e.g., the first artificial neural network 502 and the second artificial neural network 504) to predict performance metrics. The process 700 of training the artificial neural networks is outlined in FIG. 7. The artificial neural networks can be trained based on samples of the above-described data associated with known results. For example, a first batch of hard disc drives can be subjected to the bit-error rate test 212 and/or the adjacent-track interference test 214 to determine each hard disc drive's bit-error rate and adjacent track interference value (step 702). The artificial neural network can use previous test data (e.g., data generated and collected from the series of tests, including data not typically used to compute bit-error rate and/or adjacent track interference) as known inputs and each hard disc drive's bit-error rate and/or adjacent-track interference value as a known output (e.g., target) to train the artificial neural networks (step 704). The trained artificial neural networks can develop a computational model capable of predicting, based on the type of information described above, the bit-error rate and/or adjacent track interference values for other hard disc drives (step 706). For example, the trained artificial neural network can use previous test data, such as component-level test data, from the series of tests associated with a second batch of hard disc drives 306 to predict device-level performance of the hard disc drives in the second batch, such the bit-error rate and/or adjacent track interference values. In certain embodiments, the trained artificial neural networks make such predictions without actually subjecting the second batch of hard disc drives to the bi-error rate test 212 and/or the adjacent-track interference test 214—thus reducing the time to manufacture the hard disc drives. As such, the process of grading hard disc drives can utilize a multi-variant (e.g., testing data from a variety of component-level tests), non-linear (e.g., artificial neural networks with different weighted nodes/inputs) approach to save testing time.

In certain embodiments, the first batch of hard disc drives is a small percentage of the overall number of hard disc drives manufactured, such that only a small percentage of hard disc drives are used to train the artificial neural networks. The first batch of hard disc drives subjected to the bit-error rate test 212 and/or the adjacent track interference test 214 should be representative of the second batch hard disc drives that will not be subjected to such tests. In certain embodiments, data from the first batch of hard disc drives (e.g., the training hard disc drives) are used to predict bit-error rates and/or adjacent track interference values of an entire hard disc drive product line. In certain embodiments, data from the first batch of hard disc drives are used to predict bit-error rates and/or adjacent track interference values for a single batch of hard disc drives. In certain embodiments, the artificial neural networks are retrained when certain manufacturing processes are changed, as those changes may affect how representative the original training data is for hard disc drives manufactured under a different process.

The number of "training" hard disc drives used can vary. In certain embodiments, ten percent or less of a model or batch of hard disc drives are subjected to bit-error rate test 212 and/or the adjacent track interference test 214 to train the artificial neural networks, while the remaining ninety percent or more of the model or batch of hard disc drives are "tested" through the trained artificial neural networks. Of course, other percentages (e.g., 20%, 30%, 40%) of models or batches of hard disc drives can be used to train the artificial neural networks. Using a greater number of hard disc drives to train the artificial neural networks may improve reliability of the trained artificial neural network but decrease the test time savings.

In certain embodiments, the artificial neural network 302 is used to completely replace the bit-error rate test 212 and the adjacent-track interference test 214. For example, the artificial neural networks could be programmed to identify which hard disc drives will not meet a minimum threshold (e.g., minimum bit-error rate) without subjecting those hard disc drives to the corresponding tests. In certain embodiments, the artificial neural network is used to flag which hard disc drives should be subjected to the bit-error rate test 212 and the adjacent-track interference test 214, for example, because the artificial neural network predicts that those hard disc drives are unlikely to exhibit the required performance characteristics. In other words, the artificial neural network can be programmed to determine which hard disc drives are more or most likely to fail—a determination which can be confirmed by subjecting such hard disc drives to the actual pass/fail test.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A method for testing and grading electronic devices, the method comprising:
    training a first artificial neural network to predict a first performance metric using data from predetermined categories of testing data, the trained first artificial neural network comprising a first set of coefficients associated with the respective predetermined categories of testing data;
    training a second artificial neural network to predict a second performance metric using data from the predetermined categories of testing data, the trained second artificial neural network comprising a second set of coefficients associated with the respective predetermined categories of testing data;
    subjecting an electronic device to a plurality of tests to generate a set of data associated with the electronic device, the set of data including categories of data from the predetermined categories of testing data;
    in response to the generated set of data, using the first neural network and the first set of coefficients to compute the first performance metric associated with the electronic device;
    in response to the generated set of data, using the second neural network and the second set of coefficients to compute the second performance metric associated with the electronic device;
    based on at least the first predicted performance metric and the second predicted performance metric, determining that a grade for the electronic device is below a predetermined threshold for the first performance metric or the second performance metric; and
    in response to the determining that the grade is below the predetermined threshold, generating an updated testing routine for the electronic device.

2. The method of claim 1, wherein the updated testing routine includes instructions to re-run the electronic device through at least one of the plurality of tests.

3. The method of claim 1, wherein the first performance metric is a bit-error rate.

4. The method of claim 3, wherein the second performance metric is an adjacent track interference value.

5. The method of claim 4, wherein the set of data includes servo parameter values, fly height parameter values, and magnetic recording medium flaw parameter values.

6. The method of claim 1, wherein the electronic device is a hard disc drive, the method further comprising:
    formatting the hard disc drive after determining the grade.

7. A method for testing and grading electronic devices, the method comprising:
    receiving a set of testing data associated with an electronic device that is following a testing routine, wherein the set of testing data is generated during a plurality of tests on the electronic device;
    based on the set of testing data, computing a first performance metric of the electronic device by using a first trained artificial neural network comprising a first set of adaptive weights associated with categories of the testing data;
    based on the set of testing data, computing a second performance metric of the electronic device by using a second trained artificial neural network comprising a second set of adaptive weights associated with the categories of the testing data;
    based on at least the first performance metric and the second performance metric, computing a grade for the electronic device;
    determining whether the computed grade is below or above a predetermined threshold;
    if the computed grade is below the predetermined threshold, generating an updated testing routine for the electronic device; and
    if the computed grade is above the predetermined threshold, continuing to follow the testing routine.

8. The method of claim 7, further comprising:
    subjecting the electronic device to the plurality of tests to generate the set of testing data.

9. The method of claim 7, wherein the updated testing routine includes instructions to re-run the electronic device through at least one of the plurality of tests.

10. The method of claim 7, wherein the first performance metric is a bit-error rate.

11. The method of claim 10, wherein the second performance metric is an adjacent track interference value.

12. The method of claim 7, wherein the set of testing data comprises data from predetermined categories of testing data.

13. The method of claim 12, wherein the set of testing data includes servo parameter values, fly height parameter values, and magnetic recording medium flaw parameter values.

14. The method of claim 12, wherein the predetermined categories of data includes ten to twenty different types of categories of data.

15. The method of claim 7, further comprising:
    training the first artificial neural network to predict the first performance metric based on data from predetermined categories of testing data; and
    training a second artificial neural network to predict the second performance metric based on data from the predetermined categories of testing data.

16. The method of claim 7, wherein the electronic device is a hard disc drive, the method further comprising:
    formatting the hard disc drive after determining the grade.

17. A system for grading an electronic device, the system comprising:
    a computing device comprising a first trained artificial neural network comprising a first plurality of coefficients, a second trained artificial neural network comprising a second plurality of coefficients, a processor, and a memory,
    wherein the computing device is configured to:
        receive a set of testing data associated with an electronic device and generated during a plurality of tests on the electronic device,
        compute a first performance metric of the electronic device using the first trained artificial neural network, the first plurality of coefficients, and the received set of testing data,
        compute a second performance metric of the electronic device using the second trained artificial neural network, the second plurality of coefficients, and the received set of testing data, and
        compute a grade for the electronic device based on at least the first performance metric and the second performance metric.

18. The system of claim 17, wherein the first performance metric is a bit-error rate.

19. The system of claim 18, wherein the second performance metric is an adjacent track interference value.

20. The system of claim 17, wherein the set of testing data includes servo parameter values, fly height parameter values, and magnetic recording medium flaw parameter values.

* * * * *